(12) United States Patent
Cumbie et al.

(10) Patent No.: US 11,136,703 B2
(45) Date of Patent: Oct. 5, 2021

(54) MIXING CHAMBER FOR LAUNDRY SUPPLIES

(71) Applicant: Hewlett-Packard Development Company, L.P., Houston, TX (US)

(72) Inventors: Michael W Cumbie, Albany, OR (US); David Olsen, Corvallis, OR (US); Diane R Hammerstad, Corvallis, OR (US); Eric M Laplante, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 236 days.

(21) Appl. No.: 16/064,188

(22) PCT Filed: Apr. 8, 2016

(86) PCT No.: PCT/US2016/026710
§ 371 (c)(1),
(2) Date: Jun. 20, 2018

(87) PCT Pub. No.: WO2017/176288
PCT Pub. Date: Oct. 12, 2017

(65) Prior Publication Data
US 2019/0003097 A1    Jan. 3, 2019

(51) Int. Cl.
*D06F 39/02*   (2006.01)
*G05B 19/042*   (2006.01)
*D06F 33/00*   (2020.01)

(52) U.S. Cl.
CPC .............. *D06F 33/00* (2013.01); *D06F 39/02* (2013.01); *D06F 2202/10* (2013.01);
(Continued)

(58) Field of Classification Search
CPC ...... D06F 33/02; D06F 39/02; D06F 2202/10; D06F 2204/02; D06F 2214/00; G05B 19/042; G05B 2219/2633
(Continued)

(56) References Cited

U.S. PATENT DOCUMENTS

| 5,957,144 A | 9/1999 | Neff et al. |
| 7,789,967 B2 | 9/2010 | Classen |

(Continued)

FOREIGN PATENT DOCUMENTS

| CN | 202644207 | 1/2013 |
| EP | 2339059 | 6/2011 |

(Continued)

OTHER PUBLICATIONS

Berg, Cloudwash: The Connected Washing Machine, (Web Page) <http://bergcloud.com/case-studies/cloudwash/ ~6 pages.
(Continued)

*Primary Examiner* — Levon J Shahinian
(74) *Attorney, Agent, or Firm* — HP Inc. Patent Department (57) ABSTRACT

Example implementations relate to a mixing chamber for laundry supplies. For example, an appliance may include a mixing chamber to receive at least one laundry supply and a processor coupled to the mixing chamber. The processor is to identify a user-specified setting associated with a laundry load, determine a characteristic of the laundry load, calculate an amount of the at least one laundry supply to apply to the laundry load based on the user-specified setting and the characteristic, and provide the amount of the at least one laundry supply to the mixing chamber, where the mixing chamber is to mix the amount of the at least one laundry supply.

20 Claims, 8 Drawing Sheets

(52) U.S. Cl.
CPC ...... *D06F 2204/02* (2013.01); *D06F 2214/00* (2013.01); *G05B 19/042* (2013.01); *G05B 2219/2633* (2013.01)

(58) Field of Classification Search
USPC ..... 8/137, 158, 159; 68/12.02, 12.04, 12.05, 68/12.19, 17 R
See application file for complete search history.

(56) References Cited

U.S. PATENT DOCUMENTS

| | | | |
|---|---|---|---|
| 8,815,018 | B2 | 8/2014 | Housmekerides et al. |
| 2010/0287709 | A1* | 11/2010 | Doyle ................ A47L 15/0023 8/137 |
| 2013/0073690 | A1 | 3/2013 | Desalvo et al. |
| 2013/0125315 | A1 | 5/2013 | Nieh et al. |
| 2014/0013517 | A1 | 1/2014 | Janke et al. |
| 2014/0165663 | A1 | 6/2014 | Celotto et al. |
| 2014/0283561 | A1 | 9/2014 | McKenna et al. |
| 2015/0067969 | A1 | 3/2015 | Boylston |
| 2015/0152584 | A1 | 6/2015 | Gasparini et al. |
| 2015/0252513 | A1 | 9/2015 | Seo et al. |
| 2015/0267338 | A1 | 9/2015 | Helms et al. |
| 2015/0361608 | A1 | 12/2015 | Pollett et al. |

FOREIGN PATENT DOCUMENTS

| | | |
|---|---|---|
| JP | 2004174043 | 6/2004 |
| KR | 20070059413 | 6/2007 |

OTHER PUBLICATIONS

Daniels, G., The Connected Washing Machine? Well That's a Load Off My Mind, (Web Page) <http://www.telecomtv.com/articles/ ~1 page.

Monitoring Connected Appliances—Washing Machines Example, (Web Page), Apr. 14, 2014, <http://www.virdata.com/ ~4 pages.

Sensotronic, BOSCH Dishwasher Training, Feb. 22, 2007, <http://www.rnsaworld.com/wp-content/uploads/sites/3/2014/07/Bosch ~42 pages.

Your Perfect Laundry Solutions, BOSCH Brochure (Web Page), Nov. 11, 2013. http://www.bosch-home.com.sg/Files/Bosch/Sg/ ~28 pages.

* cited by examiner

MIXING CHAMBER FOR LAUNDRY SUPPLIES

BACKGROUND

The Internet of Things refers to a network of objects, embedded with electronics, software, sensors, and network connectivity, that enables these objects to collect and exchange data. For example, the Internet of Things allows objects to be sensed and controlled remotely across an existing network infrastructure.

BRIEF DESCRIPTION OF THE DRAWINGS

Some examples of the present application are described with respect to the following figures.

DETAILED DESCRIPTION

As described above, the Internet of Things (IoT) refers to a network of objects, embedded with electronics, software, sensors, and network connectivity, that enables these objects to collect and exchange data. Examples of such objects in a home setting include appliances, various other devices, and lights, all controlled in an intelligent manner such that automation may be provided. Currently, appliances such as washing machines, dryers, dishwashing machines, and the like provide little automation and may involve a user performing various activities in order to operate these appliances, such as providing the appropriate amount of laundry detergent to the washing machine.

Examples discussed herein may provide for the intelligent sensing of laundry supplies to automatically replenish supplies when needed. For example, a washing machine may include a fluid detection sensor to detect an amount of laundry supplies presently stored within the washing machine. This may include detecting a level of fluid (e.g., detergent, softener, bleach, fragrance, etc.) in a particular container within the washing machine. As used herein, the term fluid may include any suitable material, such as a liquid, powder, paste, and the like. A processor coupled to the fluid detection sensor may compare the detected level of fluid to a predetermined threshold level, where the predetermined threshold level may be any suitable level at which laundry supplies are to be ordered from a supplier (e.g., level of fluid is at 10% of the maximum capacity for the container). When the level of fluid reaches the predetermined threshold level, a request to order a new container is automatically sent to a server over a network, where the server may be associated with fulfilling the requested order.

Other examples discussed herein may include a water sense chamber to intelligently sense the quality of water being used in an appliance. The quality of the water may be measured based on any suitable criteria, such as temperature, turbidity, pH, and the like. For example, a washing machine may include a water sense chamber that may detect the quality of water entering the washing machine (e.g., tap water) and/or may detect the cleanliness of the water after a rinse cycle in order to determine whether items in the washing machine have been thoroughly cleaned.

Other examples discussed herein may include a mixing chamber in an appliance to provide the intelligent mixing of the appropriate amount(s) of various laundry supplies based on the laundry load that is in the appliance. For example, user-specified settings associated with a laundry load may be identified, where the user-specified settings may include any suitable settings that may be specified by a user, such as a temperature of water, a spin speed, a clothing type, a soil level associated with the laundry load, and the like. Characteristics of the laundry load may also be determined, where the characteristics of the laundry load may be any suitable characteristics that are measurable and/or detectable, such as a weight of the laundry load, a color of the laundry load, a soil level of the laundry load, scented versus unscented treatment of clothing, and the like. These characteristics and user-specified settings may be used to calculate an amount of at least one laundry supply to apply to the laundry load (e.g., detergent, softener, bleach, fragrance, dishwashing soap, etc.). The calculated amounts of laundry supplies may be intelligently mixed within the mixing chamber with a predetermined amount of water such that the mixed solution may be applied to the laundry load.

Figure 1:
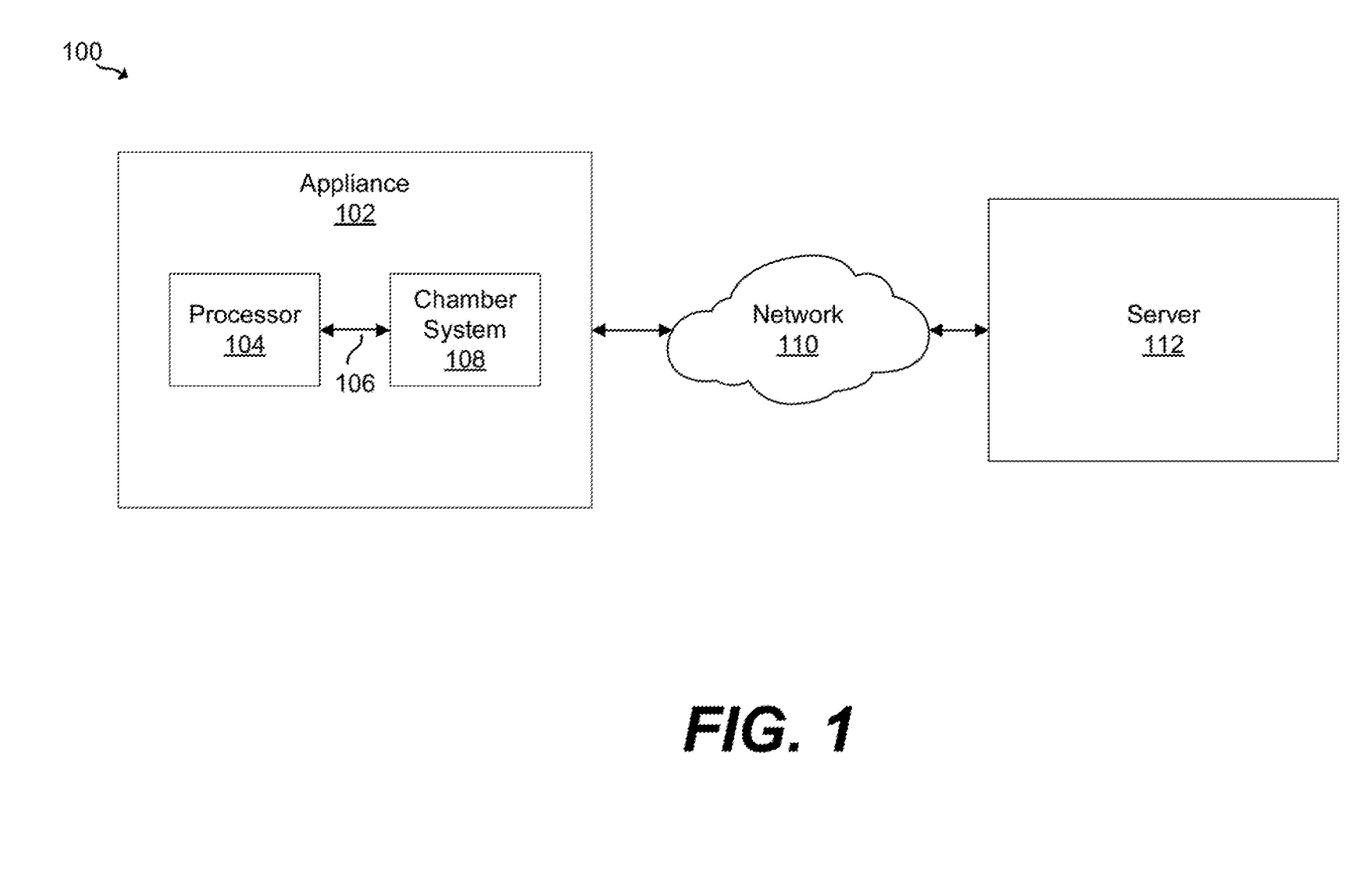
FIG. 1 illustrates an example system having an appliance in communication with a server.

Referring now to the figures, FIG. 1 illustrates an example system 100 having an appliance 102 in communication with a server 112. The appliance 102 may be any suitable household appliance (e.g., a washing machine, a dryer, a dishwashing machine, etc.) that includes any suitable processor 104 in communication with a chamber system 108 via a connection 106 (e.g., an electrical connection). The chamber system 108, as will be described in more detail below for FIG. 2, may be any suitable chamber system that includes a fluid detection sensor, a mixing chamber, and/or a water sense chamber.

The appliance 102 may be in communication with a server 112 over a network 110, which may be any suitable network, such as an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks. The server 112 may be any suitable server to receive data from and/or provide data to the appliance 102. For example, the server 112 may be associated with a supplier of laundry supplies, and the appliance may send a request to order supplies to the server 112 over the network 110.

Figure 2:
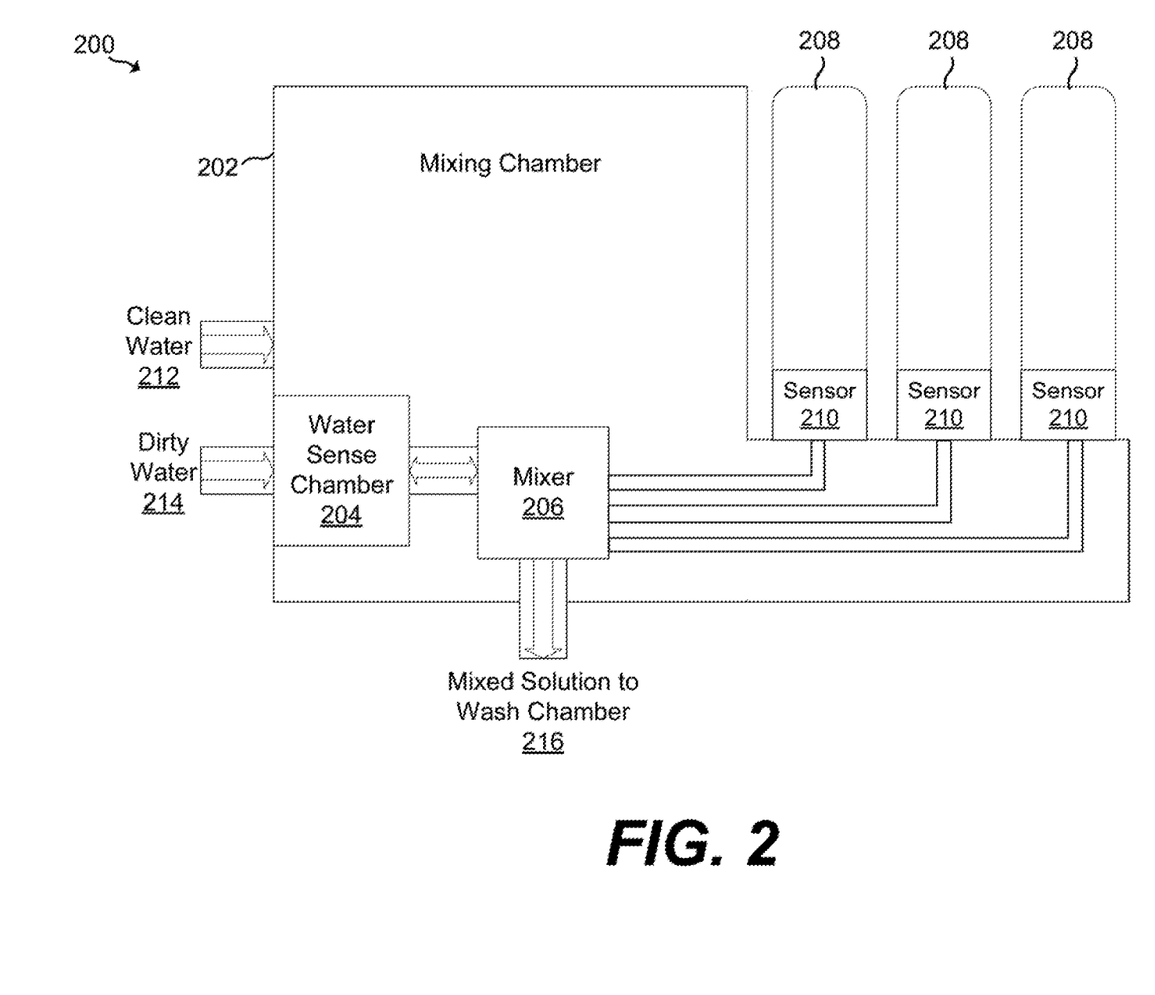
FIG. 2 is a block diagram of an example chamber system having a mixing chamber connected to laundry supplies.

FIG. 2 is a block diagram of an example chamber system 200 having a mixing chamber 202 connected to laundry supplies. The chamber system 200 may be similar to the chamber system 108 in FIG. 1 and may include the mixing chamber 202, a water sense chamber 204, a mixer 206, and any suitable number of sensor(s) 210.

The sensor(s) 210 may be any suitable sensors for detecting fluid in the container(s) 208. For example, the sensor(s) 210 may detect an amount of laundry supplies present within the container(s) 208, including detecting a level of laundry supply fluid in a container 208. A laundry supply may be any suitable material used in a laundry process, such as detergent, softener, bleach, a fragrance, and the like. The container(s) 208 may be any suitable containers housing laundry supplies and may be removable from the chamber system 200 and replaceable with other containers. For example, once the laundry supply fluid from a container 208 is used, the container 208 may be removed and/or returned to a supplier and replaced with a new container having a replenished supply of the laundry supply fluid.

The sensor(s) 210 may be in communication with a processor of an appliance housing the chamber system 200, such as the processor 104 of FIG. 1. When a sensor 210 detects an amount of fluid present in a container 208, the processor may compare that level of fluid to a predetermined threshold level, where the predetermined threshold level may be a level and/or amount of fluid at which laundry supplies are to be reordered. The processor may automatically send a request to order a new container from a server (e.g., server 112 of FIG. 1) when the level of fluid in the container 208 reaches the predetermined threshold level. The order may be based on the type of laundry supply housed within the container 208 to be replaced. For example, the processor may determine a particular type of laundry supply to be replaced based on a bar code or electronic identifier on the container 208 to be replaced.

The mixing chamber 202 may be any suitable chamber in which fluid may be contained and/or mixed. For example, the mixing chamber 202 may receive clean water 212 from any suitable source (e.g., tap water). The mixing chamber 202 may include a mixer 206 to mix a predetermined amount of clean water 212 and any combination of laundry supplies from the container(s) 208 to create a mixed solution 216 to be sent to the wash chamber. The wash chamber may be the chamber of the appliance in which the laundry load is washed. In some examples, a laundry supply may be a concentrated solution, and as such, the predetermined amount of water may account for this concentration. For example, an increased amount of water may be mixed with a laundry detergent that is a concentrated solution.

The mixing chamber 202 may also be in communication with a processor of an appliance housing the chamber system 200, such as the processor 104 of FIG. 1. The processor may be capable of identifying a user-specified setting associated with a laundry load as well as a characteristic of the laundry load. The processor may calculate an amount of each type of laundry supply within container(s) 208, as well as a predetermined amount of water, based on the user-specified setting and the characteristic of the laundry load. The calculated amount of each type of laundry supply may be provided to the mixing chamber 202, where the mixing chamber 202 may mix the laundry supplies with the predetermined amount of water. For example, for a small load of laundry containing only white colored items, the processor may calculate a particular amount of water, laundry detergent, softener, bleach, and/or a fragrance to be mixed in the mixing chamber 202 to create a mixed solution 216 for that particular load of laundry in the wash chamber.

In some examples, the characteristics of the laundry load may be determined by reading radio frequency identification (RFID) tags on items in the laundry load. A laundry load may include any number of items that each include an RFID tag specifying characteristics of the associated item, such as its color, delicacy, the temperature at which it should be washed, and the like. These RFID tags may be waterproof and may be read by an RFID reader in the appliance such that the characteristics of the laundry load may be determined. These characteristics may be used to determine how to wash the laundry load. For example, the laundry load may be washed using the setting of the item(s) that has an RFID tag indicating the highest delicacy, brightest color, and/or lowest temperature. In some examples, the RFID tags may be used to determine whether a particular item should not be included in the laundry load and may warn the user if such an item is included in the laundry load (e.g., a red sock in a laundry load having primarily white items).

The water sense chamber 204 may be any suitable water sense chamber to sense the cleanliness of the clean water 212 in the mixing chamber 202 and/or the dirty water 214. For example, the dirty water 214 may be received by the water sense chamber 204 from the wash chamber during a rinse cycle. Dirty water 214 from the wash chamber may enter the water sense chamber 204, and the water sense chamber 204 may determine the cleanliness of the water. Based on the cleanliness of the water, certain predetermined actions may occur. For example, if the water meets a particular cleanliness threshold, the laundry load may be clean enough to begin the spin cycle. As used herein, a spin cycle may refer to any process to remove moisture (e.g., a spin cycle for clothes in a washing machine, a drying cycle for a dryer or a dishwashing machine, etc.). If the water does not meet a particular cleanliness threshold, another rinse cycle may be performed for the laundry load.

The water sense chamber 204 may include any number of sensors to sense the cleanliness of water. For example, the water sense chamber 204 may include a sensor to detect characteristics of water, such as temperature, turbidity, pH, hardness of the water, and the like. In some examples, the water sense chamber 204 may house a standard water sample, which may be a sample amount of the clean water 212. This standard water sample may be the sample of water by which the dirty water 214 is compared. For example, the sensors in the water sense chamber 204 may determine whether the dirty water 214 is clean enough as compared to the standard water sample by comparing characteristics of the dirty water 214 and the standard water sample, such as temperature, turbidity, pH, and the like.

The water sense chamber 204 may also be in communication with a processor of an appliance housing the chamber system 200, such as the processor 104 of FIG. 1. The processor may direct the water sense chamber 204 to obtain a liquid sample from fluid used in an operation of the appliance (e.g., a sample of dirty water 214), measure a property of the liquid sample using the sensor in the water sense chamber 204 (e.g., temperature, turbidity, pH, etc.), generate a comparison of the property of the liquid sample and a property the standard water sample, and perform an action based on the comparison. Examples of actions that may be performed based on the comparison include a rinse cycle, a spin cycle, a wash cycle, and the like.

In some examples, the water sense chamber 204 may determine whether the dirty water 214 is clean enough to reuse in the wash chamber. In some examples, the water sense chamber 204 may include a water filtration system to filter the dirty water 214 for reuse. In some examples, the processor in communication with the water sense chamber 204 (e.g., processor 104 of FIG. 1) may direct the water sense chamber 204 to allow water from a particular water source to be used in the wash chamber. For example, in regions that actively conserve water or have water restrictions (e.g., drought-stricken regions), the processor in communication with the water sense chamber 204 may direct the water sense chamber 204 to reuse the dirty water 214 (e.g., after using a water filtration system) more often than it would be used in regions with fewer water restrictions. In these cases, the water filter in the water filtration system may be changed more frequently, and the processor may notify a user when the filter is to be replaced or may intelligently send a supplier a request to order a new filter.

In some examples, the water sense chamber 204 may determine the quality of the clean water 212 entering the appliance to determine whether it meets a particular standard for use. For example, the cleanliness and/or mineral content of tap water varies based on geographic location. This can be measured and compared to a lookup table indicating a cleanliness and/or mineral content threshold based on geographic location. For example, the water quality in one country may be lower than it is in another country, and the clean water 212 may be measured to determine whether it meets the geographic standard.

In some examples, the processor in communication with the chamber system 200 may provide status notifications to a user about the state of the appliance housing the chamber system 200 (e.g., appliance 102 of FIG. 1). For example, the processor may provide status notifications to a user (e.g., to a device of a user) when the appliance becomes available for use.

Figure 3:
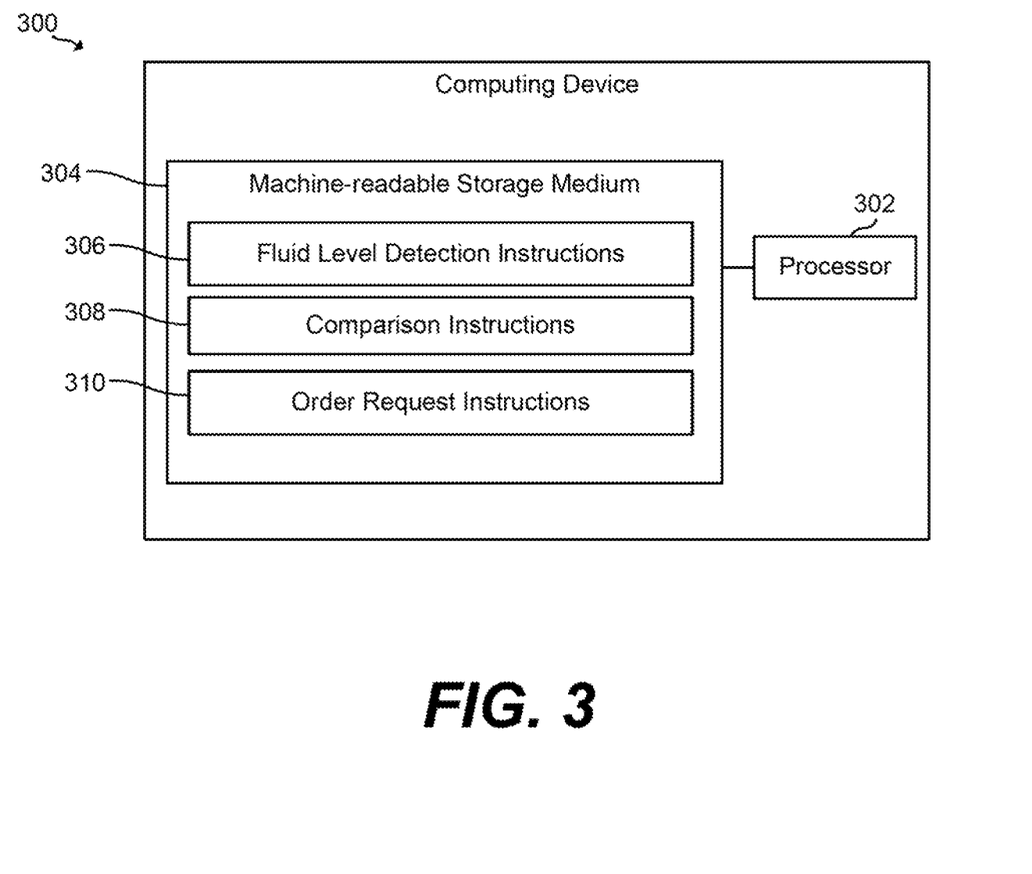
FIG. 3 is a block diagram of an example computing device for automatically ordering laundry supplies.

FIG. 3 is a block diagram of an example computing device 300 for automatically ordering laundry supplies. Computing device 300 may be any suitable computing device to send an order for laundry supplies to a server over a network.

Computing device 300 may be, for example, a washing machine, a dryer, a dishwashing machine, or any other electronic device suitable for automatically ordering laundry supplies. Computing device 300 may include a processor 302 and a machine-readable storage medium 304. Computing device 300 may monitor levels of laundry supplies housed within the computing device 300 and automatically order additional supplies based on those monitored levels.

Processor 302 is a tangible hardware component that may be a central processing unit (CPU), a semiconductor-based microprocessor, and/or other hardware devices suitable for retrieval and execution of instructions stored in machine-readable storage medium 304. Processor 302 may fetch, decode, and execute instructions 306, 308, and 310 to control a process of automatically ordering laundry supplies. As an alternative or in addition to retrieving and executing instructions, processor 302 may include at least one electronic circuit that includes electronic components for performing the functionality of instructions 306, 308, 310, or a combination thereof.

Machine-readable storage medium 304 may be any electronic, magnetic, optical, or other physical storage device that contains or stores executable instructions. Thus, machine-readable storage medium 304 may be, for example, Random Access Memory (RAM), an EPROM, an Electrically Erasable Programmable Read-Only Memory (EEPROM), a storage device, an optical disc, and the like. In some examples, machine-readable storage medium 304 may be a non-transitory storage medium, where the term "non-transitory" does not encompass transitory propagating signals. As described in detail below, machine-readable storage medium 304 may be encoded with a series of processor executable instructions 306, 308, and 310 for identifying a first level of fluid in a first container in the computing device 300 housing laundry supplies to be used during operation of the computing device 300, comparing the first level of the fluid in the first container to a predetermined threshold level, and automatically providing a request to order a new container when the first level reaches the predetermined threshold level, the request being provided to a server (e.g., server 112 of FIG. 1) over a network (e.g., network 110 of FIG. 1).

Fluid level detection instructions 306 may manage and control the identification and detection of a level of fluid in a container within computing device 300 (e.g., container 208 of FIG. 2). A level of fluid in the container within the computing device 300 may be identified by a sensor in communication with the processor 302 (e.g., sensor 210 of FIG. 2).

Comparison instructions 308 may manage and control the comparison between levels of fluid in the containers within the computing device 300 and a predetermined threshold level of fluid. As described above, the predetermined threshold level of fluid may be a level at which the reordering of supplies may be triggered.

Order request instructions 310 may manage and control automatically providing a request to order a new container when a level of fluid in the container reaches the predetermined threshold level, where the request may be provided to a server associated with a supplier of laundry supplies.

Figure 4:
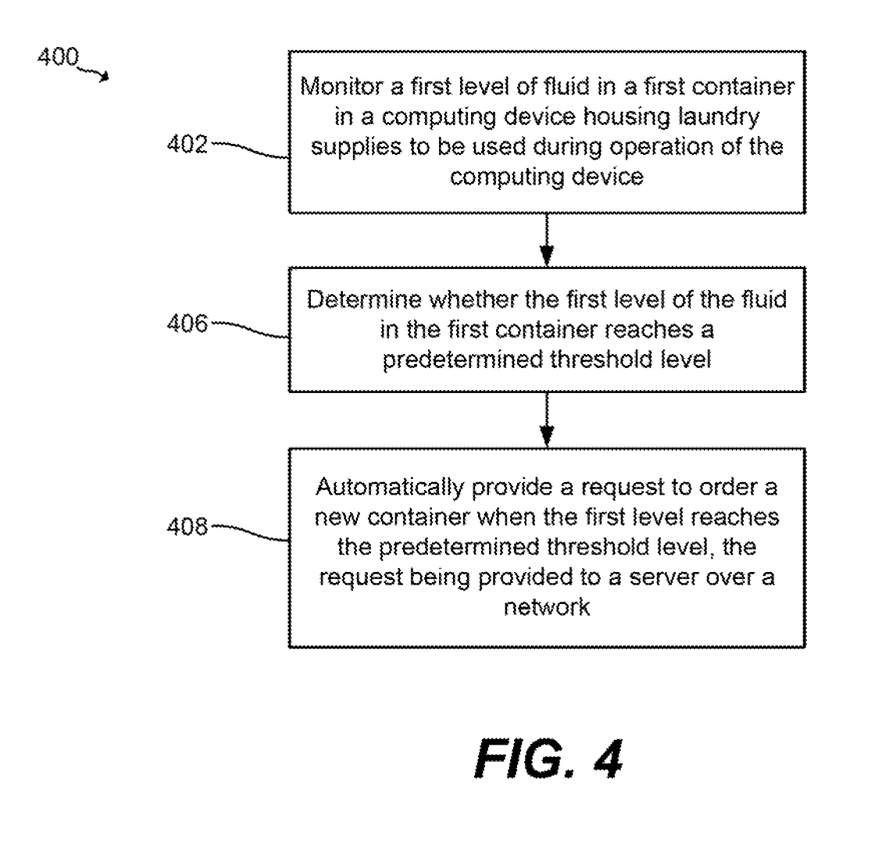
FIG. 4 is a flowchart of an example method for automatically ordering laundry supplies.

FIG. 4 is a flowchart of an example method 400 for automatically ordering laundry supplies. Method 400 may be implemented using computing device 300 of FIG. 3.

Method 400 includes, at 402, monitoring a first level of fluid in a first container in a computing device (e.g., computing device 300 of FIG. 3) housing laundry supplies to be used during operation of the computing device.

Method 400 also includes, at 404, determining whether the first level of fluid in the first container reaches a predetermined threshold level.

Method 400 also includes, at 406, automatically providing a request to order a new container when the first level reaches the predetermined threshold level, the request being provided to a server over a network.

Figure 5:
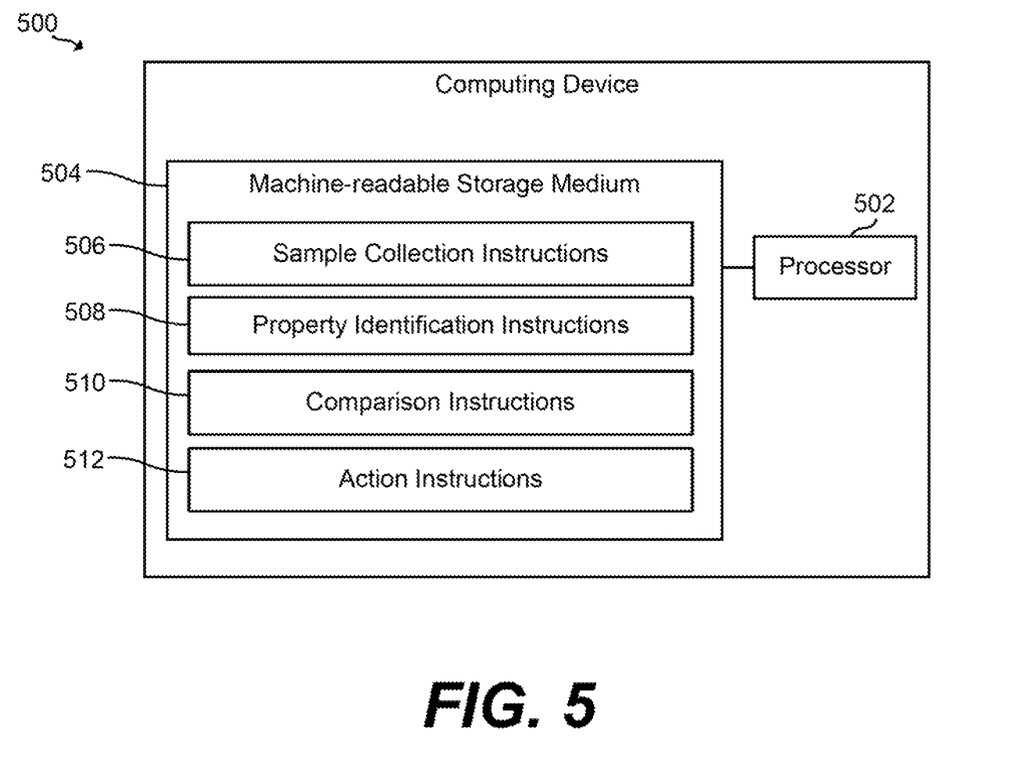
FIG. 5 is a block diagram of an example computing device for comparing properties of water samples.

FIG. 5 is a block diagram of an example computing device 500 for comparing properties of water samples. Computing device 500 may be any suitable computing device to determine a cleanliness of water used by computing device 500.

Computing device 500 may be similar to computing device 300 of FIG. 3 and may include a processor 502 (e.g., similar to processor 302 of FIG. 3) and a machine-readable storage medium 504 (e.g., similar to machine-readable storage medium 304 of FIG. 3). As described in detail below, machine-readable storage medium 504 may be encoded with a series of processor executable instructions 506, 508, 510, and 512 for obtaining a liquid sample from fluid used in an operation of the computing device 500, obtaining a standard water sample from water entering the computing device 500, identifying a first property of the liquid sample using a sensor of the computing device 500, generating a comparison of the first property and a second property of the standard water sample, and performing an action based on the comparison.

Sample collection instructions 506 may manage and control the obtaining of water samples to be measured. For example, the sample collection instructions 506 may manage and control the obtaining of a liquid sample from fluid used in an operation of the computing device 500 (e.g., dirty water 214 of FIG. 2) and the obtaining of a standard water sample from water entering the computing device 500 (e.g., clean water 212 of FIG. 2). These samples may be obtained using a water sense chamber in communication with processor 502 (e.g., water sense chamber 204 of FIG. 2).

Property identification instructions 508 may manage and control the identification of properties of liquid samples, such as temperature, hardness of water, turbidity, pH, and the like. For example, the property identification instructions 508 may manage and control the identification of properties of the fluid collected during the operation of the computing device 500 and/or the standard water sample collected from water entering the computing device 500. These properties may be identified using a sensor of the computing device 500 (e.g., a sensor in the water sense chamber 204 of FIG. 2).

Comparison instructions 510 may manage and control the generation of a comparison of the properties of water samples. For example, the comparison instructions 510 may manage and control comparing properties measured for the fluid collected during the operation of the computing device 500 and the standard water sample collected from water entering the computing device 500.

Action instructions 512 may manage and control the performing of an action based on the comparison (e.g., based on the relative cleanliness of the fluid collected during the operation of the computing device 500). For example, as described above, if the comparison indicates that the fluid collected during the operation of the computing device 500 meets a cleanliness threshold, the action of a spin cycle may be performed.

Figure 6:
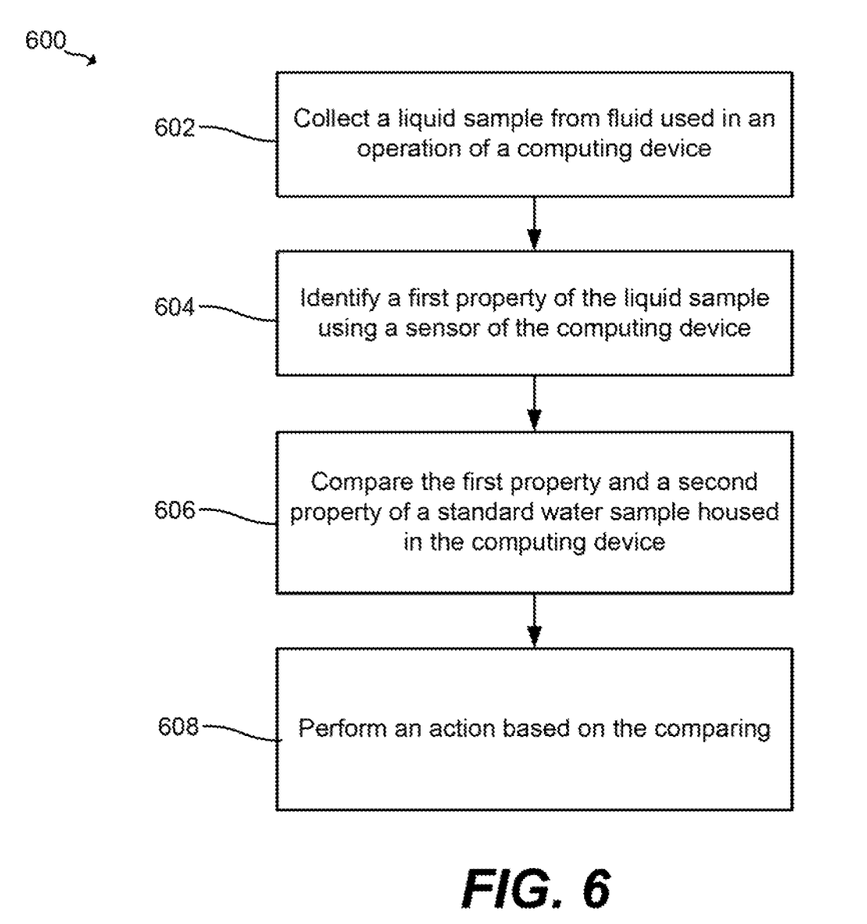
FIG. 6 is a flowchart of an example method for comparing properties of water samples.

FIG. 6 is a flowchart of an example method 600 for comparing properties of water samples. Method 600 may be implemented using computing device 500 of FIG. 5.

Method 600 includes, at 602, collecting a quid sample from fluid (e.g., dirty water 214 of FIG. 2) used in an operation of the computing device (e.g., computing device 500 of FIG. 5).

Method 600 also includes, at 604, identifying a first property of the liquid sample using a sensor of the computing device (e.g., the sensor in the water sense chamber 204 of FIG. 2).

Method 600 also includes, at 606, comparing the first property and a second property of a standard water sample (e.g., a sample of the clean water 212 of FIG. 2) housed in the computing device.

Method 600 also includes, at 608, performing an action based on the comparing (e.g., a wash cycle, a rinse cycle, a spin cycle, etc).

Figure 7:
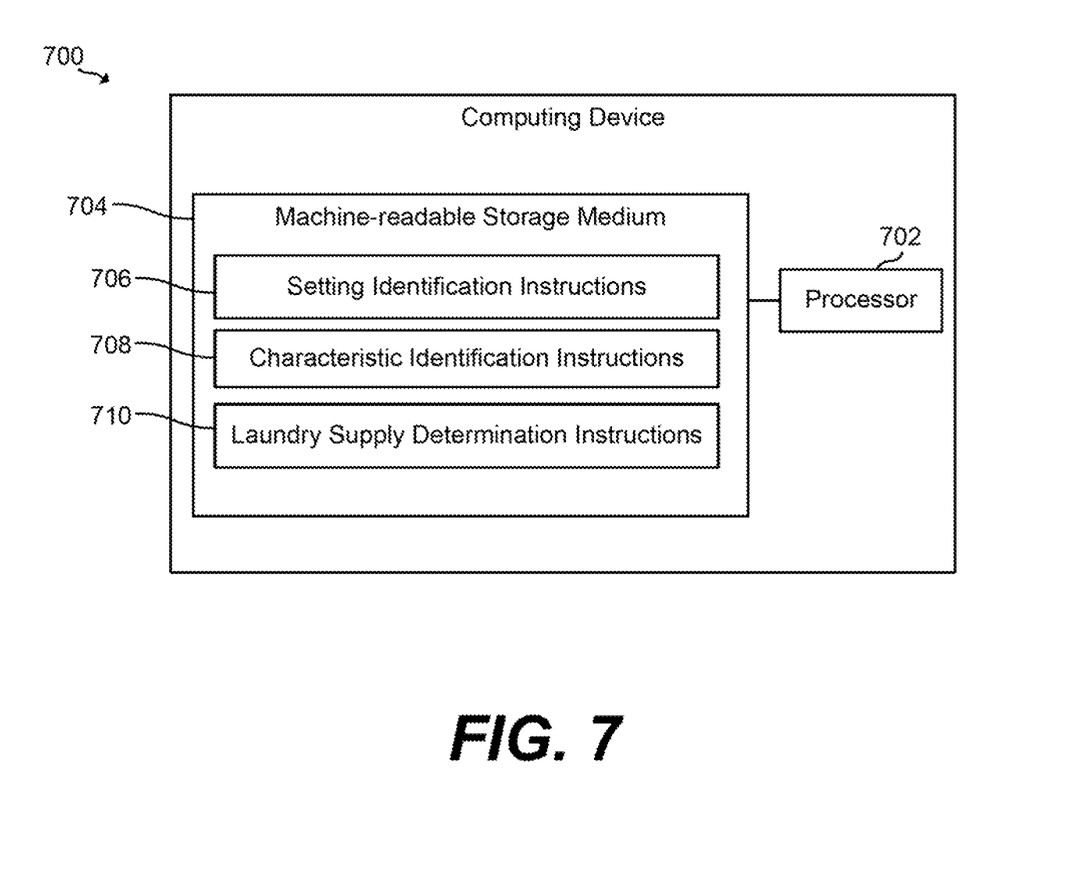
FIG. 7 is a block diagram of an example computing device for providing a laundry supply mixture.

FIG. 7 is a block diagram of an example computing device 700 for providing a laundry supply mixture. Computing device 700 may be any suitable computing device to intelligently mix laundry supplies based on user-specified settings and characteristics of a laundry load.

Computing device 700 may be similar to computing device 300 of FIG. 3 and may include a processor 702 (e.g., similar to processor 302 of FIG. 3) and a machine-readable storage medium 704 (e.g., similar to machine-readable storage medium 304 of FIG. 3). As described in detail below, machine-readable storage medium 704 may be encoded with a series of processor executable instructions 706, 708, and 710 for identifying a user-specified setting associated with a laundry load, identifying a characteristic of the laundry load, calculating an amount of at least one laundry supply to apply to the laundry load based on the user-specified setting and the characteristic, and providing the amount of the at least one laundry supply to a mixing chamber of the computing device 700, where the mixing chamber is to mix the amount of the at least one laundry supply with a predetermined amount of water to create a mixture and provide the mixture to the laundry load.

Setting identification instructions 706 may manage and control the identification of user-specified settings associated with a laundry load. For example, a user may input to the computing device 700 certain settings associated with a laundry load to be washed, such as temperature, spin speed, clothing type, soil level, and the like.

Characteristic identification instructions 708 may manage and control the identification of characteristics associated with a laundry load. For example, the characteristic identification instructions 708 may manage and control the identification of characteristics of the laundry load using any suitable sensors in the computing device 700, such as sensors to measure the weight of the laundry load, a color of the laundry load, a soil level associated with the laundry load, and the like.

Laundry supply determination instructions 710 may manage and control the calculation of an amount of at least one laundry supply to apply to the laundry bad based on the user-specified setting and the characteristics of the laundry load. The laundry supply determination instructions 710 may also manage and control the providing of that amount to a mixing chamber of the computing device 700 (e.g., mixing chamber 202 of FIG. 2), where the mixing chamber may mix the amount of the laundry supplies with a predetermined amount of water to create a mixture to be provided to the laundry load (e.g., mixed solution to wash chamber 216 of FIG. 2).

Figure 8:
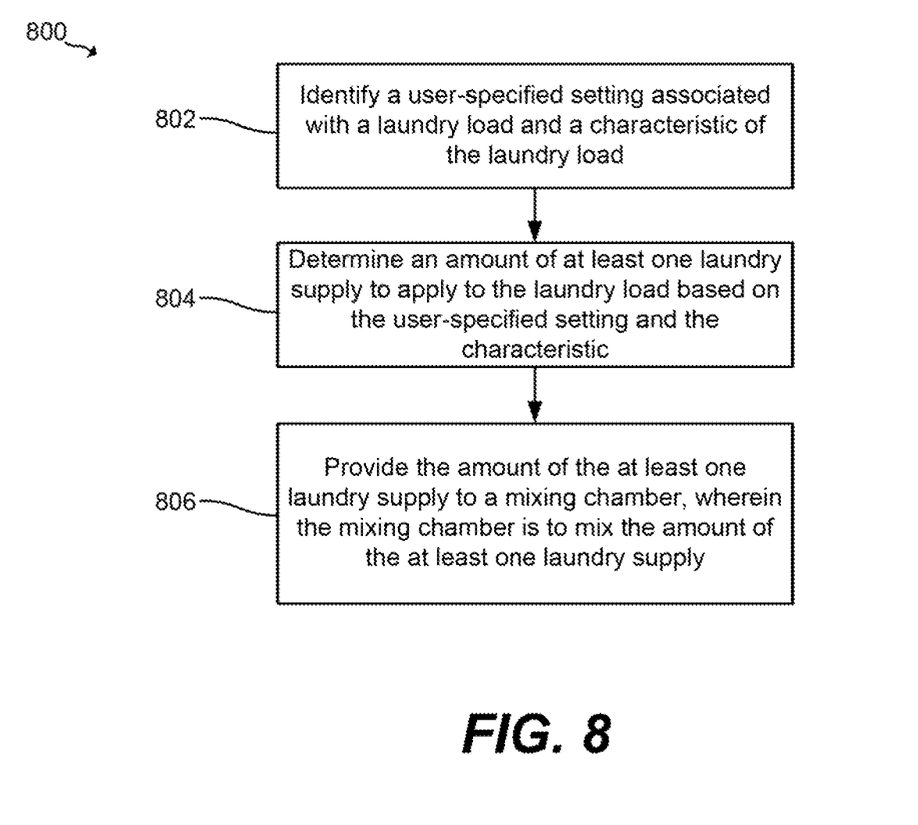
FIG. 8 is a flowchart of an example method for providing a laundry supply mixture.

FIG. 8 is a flowchart of an example method 800 for providing a laundry supply mixture. Method 800 may be implemented using computing device 700 of FIG. 7.

Method 800 includes, at 802, identifying a user-specified setting associated with a laundry load and a characteristic of the laundry load.

Method 800 also includes, at 804, determining an amount of at least one laundry supply to apply to the laundry load based on the user-specified setting and the characteristic.

Method 800 also includes, at 806, providing the amount of the at least one laundry supply to a mixing chamber (e.g., mixing chamber 202 of FIG. 2), where the mixing chamber is to mix the amount of the at least one laundry supply. In some examples, the mixing chamber may mix the amount of the at least one laundry supply together (e.g., mix the laundry supplies together) and/or may mix the amount of the at least one laundry supply with a predetermined amount of a particular material (e.g., water, bleach, etc.).

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. An appliance, comprising:
   a mixing chamber to receive at least one laundry supply;

a water sense chamber comprising a sensor; and
a processor coupled to the mixing chamber and the sensor of the water sense chamber, the processor to:
identify a user-specified setting associated with a laundry load;
determine a characteristic of the laundry load;
calculate an amount of the at least one laundry supply to apply to the laundry load based on the user-specified setting and the characteristic;
provide the amount of the at least one laundry supply to the mixing chamber, wherein the mixing chamber is to mix the amount of the at least one laundry supply with water;
measure a property of water received within the water sense chamber with the sensor; and
select an operating cycle of the appliance based on the property.

2. The appliance of claim 1, wherein the appliance is a washing machine and wherein the at least one laundry supply includes laundry detergent, softener, bleach, or a fragrance.

3. The appliance of claim 1, wherein the at least one laundry supply includes more than one type of laundry supply and wherein an amount for each type of laundry supply is calculated based on the user-specified setting and the characteristic.

4. The appliance of claim 1, wherein the user-specified setting includes a temperature, a spin speed, a clothing type, a laundry supply, or a soil level associated with the laundry load.

5. The appliance of claim 1, wherein the characteristic of the laundry load includes a weight of the laundry load, a color of the laundry load, or a soil level associated with the laundry load.

6. The appliance of claim 1, wherein the water sense chamber is to retain a sample of water.

7. The appliance of claim 1, comprising a reader that is coupled to the processor, wherein the processor is to determine the characteristic of the laundry load by reading tags on pieces of laundry of the laundry load using the reader.

8. The appliance of claim 1, wherein the processor is to:
detect a level of the at least one laundry supply within the appliance; and
order, via a network, an additional volume of the at least one laundry supply based on the detection.

9. A method, comprising:
identifying, by an appliance, a user-specified setting associated with a laundry load and a characteristic of the laundry load;
determining, by the appliance, an amount of at least one laundry supply to apply to the laundry load based on the user-specified setting and the characteristic;
providing, by the appliance, the amount of the at least one laundry supply to a mixing chamber of the computing device, wherein the mixing chamber is to mix the amount of the at least one laundry supply with water;
measuring a property of water received within a water sense chamber positioned within the appliance; and
selecting an operating cycle of the appliance based on the property.

10. The method of claim 9, wherein the appliance is a washing machine and wherein the at least one laundry supply includes laundry detergent, softener, bleach, or a fragrance.

11. The method of claim 9, wherein the at least one laundry supply includes more than one type of laundry supply and wherein an amount for each type of laundry supply is determined based on the user-specified setting and the characteristic.

12. The method of claim 9, wherein the user-specified setting includes a temperature, a spin speed, a clothing type, a laundry supply, or a soil level associated with the laundry load.

13. The method of claim 9, wherein the characteristic of the laundry load includes a weight of the laundry load, a color of the laundry load, or a soil level associated with the laundry load.

14. The method of claim 9, wherein identifying the characteristic of the laundry load comprising reading tags on pieces of laundry of the laundry load with a reader positioned within the appliance.

15. A non-transitory machine-readable storage medium storing instructions that, when executed by a processor of an appliance, cause the appliance to:
identify a user-specified setting associated with a laundry load;
identify a characteristic of the laundry load;
calculate an amount of at least one laundry supply to apply to the laundry load based on the user-specified setting and the characteristic;
provide the amount of the at least one laundry supply to a mixing chamber of the appliance, wherein the mixing chamber is to mix the amount of the at least one laundry supply with a predetermined amount of water to create a mixture and provide the mixture to the laundry load;
measure, using a sensor, a property of water received within a water sense chamber positioned within the appliance; and
select an operating cycle of the appliance based on the property.

16. The non-transitory machine-readable storage medium of claim 15, wherein the appliance is a washing machine and wherein the at least one laundry supply includes laundry detergent, softener, bleach, or a fragrance.

17. The non-transitory machine-readable storage medium of claim 15, wherein the at least one laundry supply includes more than one type of laundry supply and wherein an amount for each type of laundry supply is calculated based on the user-specified setting and the characteristic.

18. The non-transitory machine-readable storage medium of claim 15, wherein the user-specified setting includes a temperature, a spin speed, a clothing type, a laundry supply, or a soil level associated with the laundry load.

19. The non-transitory machine-readable storage medium of claim 15, wherein the characteristic of the laundry load includes a weight of the laundry load, a color of the laundry load, or a soil level associated with the laundry load.

20. The non-transitory, machine-readable storage medium of claim 15, wherein the instructions, when executed by the processor, cause the appliance to identify the characteristic of the laundry load by reading tags on pieces of laundry of the laundry load with a reader positioned within the appliance.

* * * * *